United States Patent [19]

Komatsu

[11] 4,377,895
[45] Mar. 29, 1983

[54] METHOD FOR MANUFACTURING DOUBLE-GEAR TRAINS

[75] Inventor: Fumito Komatsu, Shiojiri, Japan

[73] Assignee: Kabushiki Kaisha Sanyo Seiki Sisakusho, Nagano, Japan

[21] Appl. No.: 198,996

[22] Filed: Oct. 21, 1980

[30] Foreign Application Priority Data

Dec. 24, 1979 [JP] Japan .............................. 54-168044

[51] Int. Cl.³ .............................................. B29D 15/00
[52] U.S. Cl. .................................. 29/434; 29/159.2; 29/559; 264/242; 264/264; 264/297
[58] Field of Search ............... 29/434, 159.2, 559; 264/242, 297, 264; 249/119, 123, 124, 126, 129, 131

[56] References Cited

U.S. PATENT DOCUMENTS

| | | | |
|---|---|---|---|
| 3,362,675 | 1/1968 | Ferdig | 249/129 |
| 3,443,005 | 5/1969 | Braun | 264/242 |
| 3,727,427 | 4/1973 | Eyman, Jr. et al. | 249/129 |
| 3,835,519 | 9/1974 | Hetzel | 29/434 |

*Primary Examiner*—Daniel C. Crane
*Attorney, Agent, or Firm*—Sughrue, Mion, Zinn, Macpeak and Seas

[57] ABSTRACT

A method and apparatus for manufacturing double-gear trains in which gears of double-gear trains are molded already in engagement with one another. Upper and lower gear molding cavities are formed in upper and lower molds between which is sandwiched an intermediate mold. Apertures are formed in the intermediate mold for molding shafts which join gear pairs. Thin wall dividing portions are provided between adjacent gears which are molded in engagement with one another. A molten resin introducing cavity is formed between an outer mold and the upper mold. Coupling pieces may also be molded simultaneously with the formation of the double-gear train.

3 Claims, 8 Drawing Figures

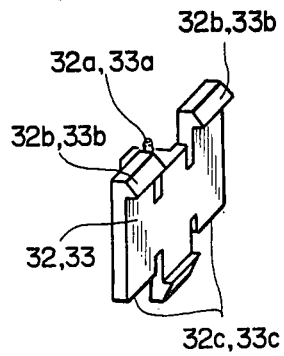
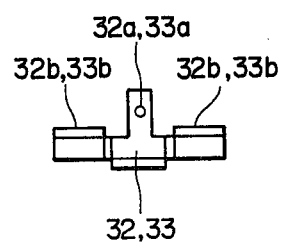
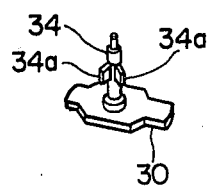
FIG. 4    FIG. 5    FIG. 6
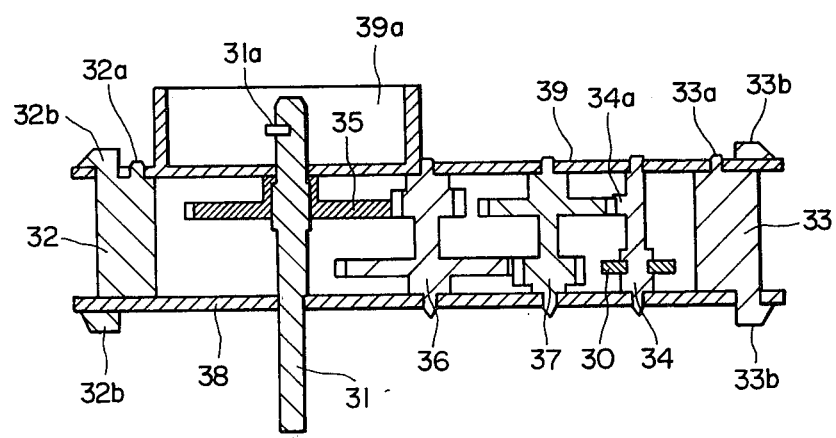
FIG. 7
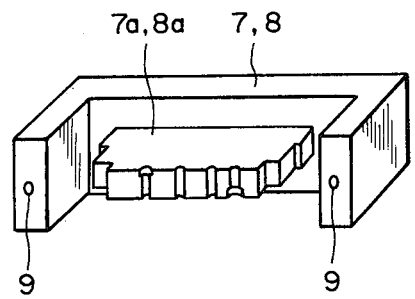
FIG. 8

METHOD FOR MANUFACTURING DOUBLE-GEAR TRAINS

BACKGROUND OF THE INVENTION

The present invention relates to a method for manufacturing double-gear trains in which the number of steps needed for assembling the double-gear trains is reduced compared with prior art methods.

With a conventional method for assembling a double-gear train, double gears having upper and lower gears are individually molded and the double gears thus molded are individually held temporarily on a lower base plate or the like. The shafts of the double gears are positioned for insertion into an upper base plate or the like while adjacent gears are maintained engaged with one another. Then, the upper base plate is coupled to the shaft ends of the double gears to complete the assembly of the double-gear train.

In accordance with the conventional method, the double gears must be molded individually and therefore the necessary manufacturing manipulations with the conventional double-gear trains are intricate. Furthermore, as the double-gear train must be assembled while adjacent gears are individually engaged with one another, the assembly work is troublesome.

In view of the above-described difficulties accompanying a conventional method for manufacturing double-gear trains, an object of the invention is to provide a method and apparatus for manufacturing double-gear trains in which double gears are simultaneously molded in such a manner that adjacent gears are engaged with one another thereby to ease the assembly of a double-gear train.

SUMMARY OF THE INVENTION

This, as well as other objects of the invention, are met by a method for manufacturing double-gear trains including the steps of combining a double-gear train molding intermediate mold which is removable from a molding device with gear molding upper and lower metal molds having thin wall portions between molded gears engaged with one another in such a manner that the upper and lower metal molds surround the intermediate mold on at least two sides thereof to form molding cavities. Molten resin is then poured into the molding cavities to mold a double-gear train in which at least some of the gears forming the double-gear trains are engaged with one another. The gear molding upper and lower metal frames are then separated from each other and the intermediate mold is removed. Frames are then mounted on the double-gear train from both above and below so that the shafts of the double-gear train are rotatably supported between the frames. The intermediate mold is then removed from the double-gear train. Preferably, the gears forming the double-gear train have the same axial distance between the lower and upper gears thereof. Coupling pieces for holding the frames can be molded simultaneously with the double-gear train.

Also, the objects of the invention are met by an apparatus for practicing such a method in which outer, upper, intermediate and lower molding frames are provided. The upper and lower gears are molded respectively in upper and lower gear forming cavities in the upper and lower molds. At least some of the adjacent gears of the upper and lower gears are molded in engagement with each other. Then wall portions are provided in the corresponding molds for the gears which are in engagement with each other. The shafts for gear pairs are formed in apertures in the intermediate mold. Preferably, the intermediate mold is formed having at least two sections which are separable. A cavity for introducing molten resin is formed between the upper and outer molds. The outer mold is joined to the upper mold through pins around which are disposed springs which urge the outer mold away from the upper mold. A supporting base is provided to hold the lower mold with knock-out pins extending through apertures in the lower mold to support the intermediate mold upon the base.

BRIEF DESCRIPTION OF THE DRAWINGS

FIG. 4 is a perspective view showing a coupling piece;

FIG. 5 is a top view of the coupling piece of FIG. 4;

FIG. 6 is a perspective view of an anchor shaft;

FIG. 7 is a sectional view showing the essential components of an assembled mechanical time switch; and FIG. 8 is a perspective view showing one of the separable metal molds which forms the intermediate mold.

DESCRIPTION OF THE PREFERRED EMBODIMENTS

A preferred embodiment of the invention will be described with reference to the accompanying drawings with reference by way of example to the fabrication of a mechanical time switch.

Figure 1:
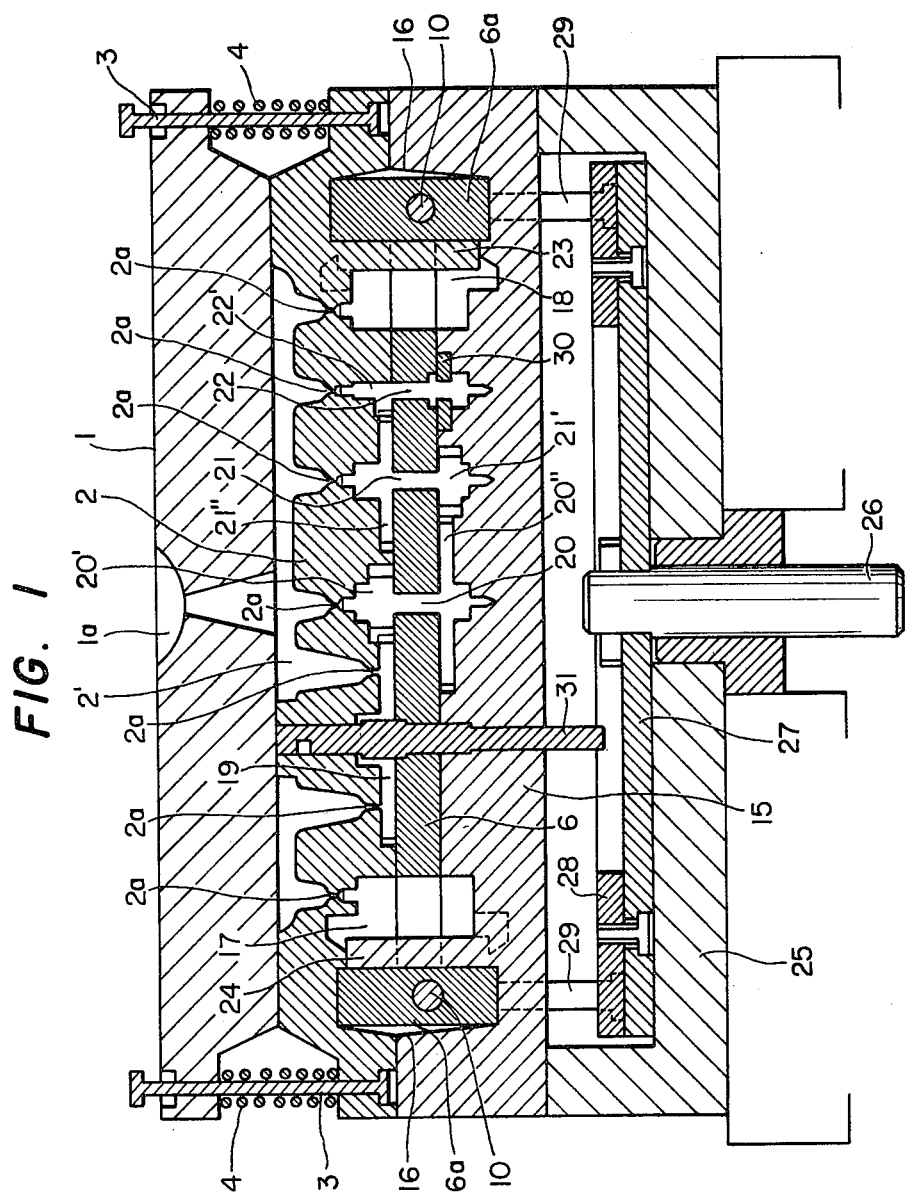
FIG. 1 is a vertical sectional view of metal molds in accordance with the invention which are ready for molding.

In FIG. 1, reference numeral 1 designates an outer metal mold and reference numeral 2 an upper metal mold. The outer metal mold 1 is coupled to the upper metal mold 2 by distance regulating shafts 3. Springs 4 are positioned on the regulating shafts 3 to urge apart the outer metal mold 1 and the upper metal mold 2.

A passage 2' is formed in the upper metal mold 2. The passage 2' is used to introduce molten resin poured through a molten resin pouring aperture 1a formed in the outer metal mold 1 into cavities through narrow apertures 2a. The narrow apertures 2a are provided in order to separate moldings or products formed in the cavities from waste material collected in the runner 2'.

Figure 2:
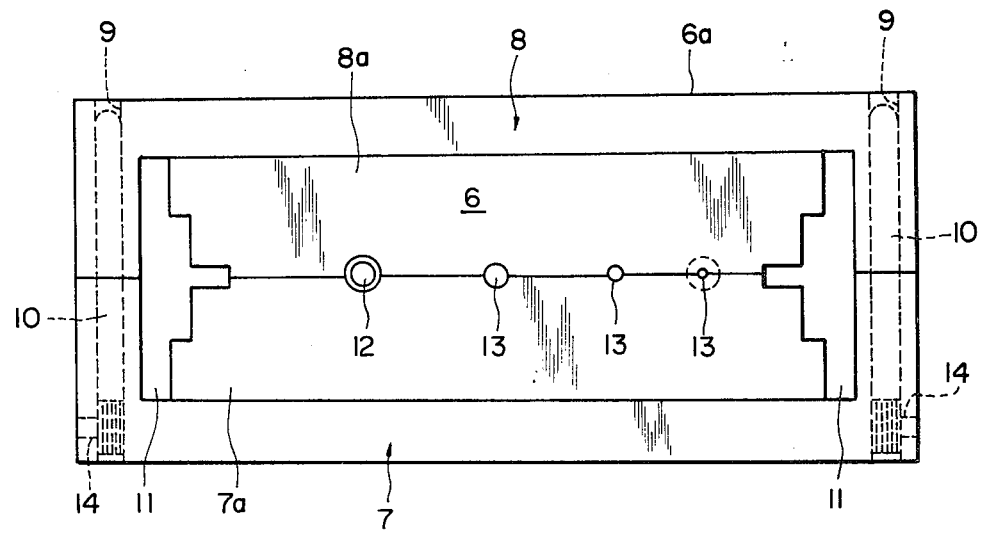
FIG. 2 is a plan view of an intermediate mold of FIG. 1.

An intermediate mold 6 for molding a double-gear train, as shown in FIG. 2, includes a pair of separable metal molds 7 and 8 which are coupled together by guide bars 10 disposed in through-holes 9 formed in the metal molds 7 and 8.

The intermediate mold 6 includes coupling piece forming cuts 11, a wind-up shaft inserting hole 12, and double-gear shaft forming holes 13. In FIG. 2, reference numerals 14 designate retaining screws for attaching the guide bars.

The intermediate mold 6 is formed by coupling the pair of metal molds 7 and 8, respectively having partition plates 7a and 8a, to each other with the use of the guide bars 10. The intermediate mold 6 is positioned between a lower metal mold 15 and the upper metal mold 2 with the frame 6a of the intermediate mold 6 engaged with a recess 16 which is formed by the lower metal mold 15 and the upper metal mold 2. With the intermediate mold 6 disposed between the lower metal mold 15 and the upper metal mold 2, cavities for forming the coupling pieces, the wind-up upper gear, the double-gear train, and the anchor shaft are formed.

Referring momentarily back to FIG. 1, reference numerals 17 and 18 designate the coupling piece forming cavities, 19 the wind-up gear forming cavity, 20 and 21 the double-gear forming cavities, and 22 the anchor shaft forming cavity.

Figure 3:
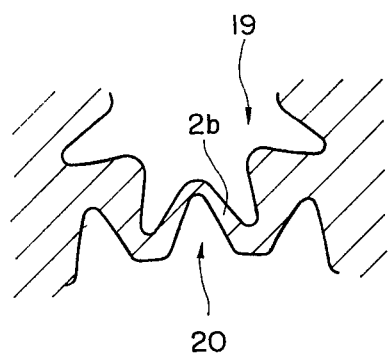
FIG. 3 is an enlarged sectional view showing the construction of a mold which molds adjacent gears in such a manner that they are engaged with each other.

As shown in FIG. 3, the upper metal mold 2 has a thin wall portion 2b between the wind-up upper gear forming cavity 19 and the upper side 20' of the double-gear forming cavity 20 adjacent to the cavity 19 wherein adjacent upper gears are molded in such a manner that they are intermeshed with each other. Similarly, the lower metal mold 15 has a thin wall portion (not shown) between the lower side 20" of the double-gear forming cavity 20 and the lower side 21' of the double-gear forming cavity 21 wherein adjacent lower gears are molded in such a manner that they are intermeshed with each other. The upper side 22' of the anchor shaft forming cavity 22 and the upper side 21" of the double-gear forming cavity 21 are so shaped that the anchor formed by the upper side 22' is in abutment with the escapement wheel which is formed by the upper side 21'.

In FIG. 1, a protrusion 23 of the upper metal mold 2 which extends toward the lower metal mold 15 and a protrusion 24 of the lower metal mold 15 which extends toward the upper metal mold 2 are provided to form locking parts for the coupling pieces 17 and 18, respectively. In FIG. 1, reference numeral 25 designates a mold base, 26 a slide shaft slidable with respect to the mold base, 27 and 28 flat plates placed on the mold base 25, and 29 knock-out pins which push upwards on the intermediate mold.

A preferred method for assembling a double-gear train manufactured according to the above-described embodiment of the invention will be described. First, an apertured plate 30 is set in the anchor shaft forming cavity 22 on the side of the lower metal mold 15. Then, the intermediate mold 6 is placed on the lower metal mold 15 and the wind-up shaft 31 is set in place. The upper metal mold 2 together with the outer metal mold 1 is brought into close contact with the lower metal mold. Therefore, molten resin is poured into the cavities through the aperture 1a. The springs 4 are compressed when the upper metal mold 2 is brought into close contact with the lower metal mold 15.

The moldings are simultaneously formed by pouring molten resin into the cavities as described above.

The coupling pieces 32 and 33 as shown in FIGS. 4 and 5 are formed in the coupling piece forming cavities 17 and 18, respectively. Formed on the coupling pieces 32 and 33 are protrusions 32a and 33a which are used for positioning the base plates. Base-plate-depressing locking portions 32b and 33b and level surfaces 32c, 33c for regulating the horizontal position of the base plate are also formed.

The anchor shaft 34 is molded in the anchor shaft forming cavity 22 as shown in FIG. 6. The anchor shaft 34 has protrusions 34a which perform the anchor function. The wind-up upper gear 35 and the double gears 36 and 37 are molded in the cavity 19 and the cavities 20 and 21, respectively, as shown in FIG. 7. After these components have been molded simultaneously, the lower metal mold 15 together with the mold base 25 is lowered. While the lower metal mold 15 and the mold base 25 are being lowered, the waste material which has collected in the runner 2' is separated from the moldings.

When the mold base 25 has been lowered, the lower end of the slide shaft 26 is struck against a striker (not shown), to raise the flat plates 27 and 28 above the mold base 25. As the knock-out pins 29 are rigidly secured to the flat plate 28, the intermediate mold 6 is moved apart from the lower metal mold 15.

Thereafter, the intermediate mold 6 in its assembled condition holding the moldings is removed from the molding device. Then, a lower base plate 38 is pushed into the frame 6a of the intermediate mold 6 in engagement with the gears 36, 37, shafts 31, 34 and coupling pieces 32, 33 as shown in FIG. 7. Similar to the case of the lower base plate 38, an upper base plate 39 having a chamber 39a for accommodating a spiral spring is set into the position shown in FIG. 7 while the gears, shafts and coupling pieces are still supported by the assembled intermediate mold.

FIG. 8 is a perspective view of the metal molds 7 and 8 forming the intermediate mold 6.

The upper and lower base plates 38 and 39 are attached through the coupling pieces 32 and 33. The wind-up shaft 31, the double gears 36 and 37, and the anchor shaft 34 are rotatably supported between the upper and lower base plates 38 and 39. Thereafter, the metal molds 7 and 8 forming the intermediate mold 6 are removed from the moldings so that the gears can operatively engage with one another. A pin 31a is inserted into the upper end portion of the wind-up shaft 31. The spiral spring (not shown) is positioned in the spiral spring accommodating chamber 39a with its end fastened to the pin 31a. At this point, the mechanical time switch has been assembled.

The invention has been described with reference to the assembly of a mechanical time switch. However, it is clear that the method of the invention is applicable to the manufacture of other mechanisms utilizing a double-gear train.

According to the invention, the double-gear train is formed using only a single molding operation in such a manner that adjacent gears are engaged with one another. The double-gear train is manufactured using an intermediate mold as a jig. Therefore, the invention is advantageous in that the number of manufacturing steps is greatly reduced and, accordingly, the time required for manufacturing double-gear trains is greatly decreased compared with the prior art.

As the double-gear train is formed with a single molding operation according to the invention, it is possible to automate the manufacture of double-gear trains.

According to the above-described embodiment, the coupling pieces for holding the base plates are molded together with the double-gear train. Therefore, the double-gear train can be readily assembled by combining the upper and lower base plates therewith. This is another advantageous feature of the invention.

The locking portions of the coupling pieces are molded by extending the locking portion forming protrusions alternately into the opposed cavities. Accordingly, the upper and lower metal molds are much simpler in construction.

Furthermore, in accordance with the invention, the double gears have the same axial distance between the upper and lower gears. Accordingly, the partition plates of the intermediate mold are equal in thickness which results in a simple construction of the intermediate mold. This is yet another advantage of the invention.

What is claimed is:

1. A method for manufacturing double-gear trains comprising the steps of:

detachably connecting an intermediate mold having shaft forming passages therethrough with upper and lower metal molds each having adjacent gear forming cavities and having thin wall portions between said adjacent gear forming cavities for molding gears intermeshed with one another in such a manner that said upper and lower metal molds surround said intermediate mold on at least two sides thereof to form said molding cavities;

pouring molten resin into said molding cavities to simultaneously mold double-gear trains in which the gears in adjacent gear forming cavities are separated from one another by said thin wall portions;

separating said gear molding upper and lower metal molds from each other and said intermediate mold so that the gears molded in adjacent gear forming cavities can operatively engage with one another;

securing supporting frames on said double-gear train from above and below said intermediate mold so that the shafts of said double-gear train are rotatably supported between said frames; and removing said intermediate mold from said double-gear train.

2. The method as claimed in claim 1, in which said gears forming said double-gear trains have the same axial distance between the upper and lower gears thereof.

3. The method as claimed in claim 1, in which coupling pieces for holding said frames together are molded simultaneously with said double-gear train.

* * * * *